United States Patent [19]

Graf

[11] Patent Number: 5,711,712
[45] Date of Patent: Jan. 27, 1998

[54] CONTROLLER FOR AN AUTOMATIC MOTOR VEHICLE TRANSMISSION

[75] Inventor: Friedrich Graf, Regensburg, Germany

[73] Assignee: Siemens Aktiengesellschaft, Munich, Germany

[21] Appl. No.: 684,030

[22] Filed: Jul. 19, 1996

Related U.S. Application Data

[63] Continuation of PCT/EP95/00135 published as WO95/20114, Jul. 27, 1995.

[30] Foreign Application Priority Data

Jan. 19, 1994 [EP] European Pat. Off. ............ 94100742

[51] Int. Cl.⁶ .................................................. B60K 41/06
[52] U.S. Cl. .......................... 477/121; 477/78; 364/424.1
[58] Field of Search ........................... 364/424.1, 426.02, 364/426.03; 74/512; 477/78, 138, 92

[56] References Cited

U.S. PATENT DOCUMENTS

| | | | |
|---|---|---|---|
| 4,841,815 | 6/1989 | Takahashi | 364/424.1 |
| 5,099,428 | 3/1992 | Takahashi | 364/424.1 |
| 5,267,158 | 11/1993 | Sakaguchi et al. | 364/424.1 |
| 5,289,740 | 3/1994 | Milunas et al. | 364/424.1 X |
| 5,323,318 | 6/1994 | Hasegawa et al. | 363/424.1 |
| 5,337,630 | 8/1994 | Sakai et al. | 364/424.1 X |
| 5,389,050 | 2/1995 | Sakai et al. | 477/78 |

FOREIGN PATENT DOCUMENTS

| | | |
|---|---|---|
| 0 375 155 | 6/1990 | European Pat. Off. . |
| 0 471 102 | 2/1992 | European Pat. Off. . |
| 0 576 703 | 1/1994 | European Pat. Off. . |
| 0 626 527 | 11/1994 | European Pat. Off. . |
| 33 41 652 | 12/1987 | Germany . |
| 93/00532 | 1/1993 | WIPO . |
| 93/00624 | 1/1993 | WIPO . |
| 93/23689 | 11/1993 | WIPO . |

OTHER PUBLICATIONS

Patent Abstracts of Japan, vol. 10, No. 181 [M-492] Jun. 25, 1986; & JP-A-61027345 (Nissan) Feb. 6, 1986.
Patent Abstracts of Japan, vol. 17, No. 555 [M-1492] Oct. 6, 1993; & JP-A-5155223 (Nissan) Jun. 22, 1993.

*Primary Examiner*—Vinh T. Luong
*Attorney, Agent, or Firm*—Herbert L. Lerner; Laurence A. Greenberg

[57] ABSTRACT

A controller for an automatic motor vehicle transmission automatically sets a transmission ratio of a continuous transmission through the use of stored data as a function of a gas pedal position and a vehicle speed. Through the use of a fuzzy logic control circuit, the engine speed is automatically set by continuous regulation of the transmission ratio, specifically to the range of optimum efficiency, minimum exhaust gas emission or maximum power. The load condition of the motor vehicle, the driving style of the driver and, as the case may be, the type of the road are taken into account in this process. A correction circuit carries out dynamic corrections of the transmission ratio. The data can be stored, for example, in control characteristic maps, or can be generated by another analogous fuzzy logic control circuit.

10 Claims, 12 Drawing Sheets

FIG.10

| CCM t(old) \ t+1 (new) | E(1) | M(2) | S(3) | TA(4) | A(5) |
|---|---|---|---|---|---|
| DRIVER-ADAPTIVE E | DRIVER <em | DRIVER >em | DRIVER >ms | LOAD >xta ∧ DRIVER <ms | LOAD>xa |
| M | DRIVER <me | ms> DRIVER >me | DRIVER >ms | LOAD >xta ∧ DRIVER <ms | LOAD>xa |
| S | DRIVER <me | DRIVER <sm | DRIVER >sm | NOT POSSIBLE | LOAD>xa |
| LOAD-ADAPTIVE TA | LOAD <tax ∧ DRIVER <me | LOAD <tax ∧ ms> DRIVER >em | DRIVER >ss | LOAD >tax | LOAD>xa |
| A | LOAD<xa ∧ DRIVER <me | LOAD<xa ∧ ms> DRIVER >em | LOAD <xa ∧ DRIVER >ms | LOAD>xa ∧ DRIVER <ms | LOAD>ax ∧ DRIVER <ms |

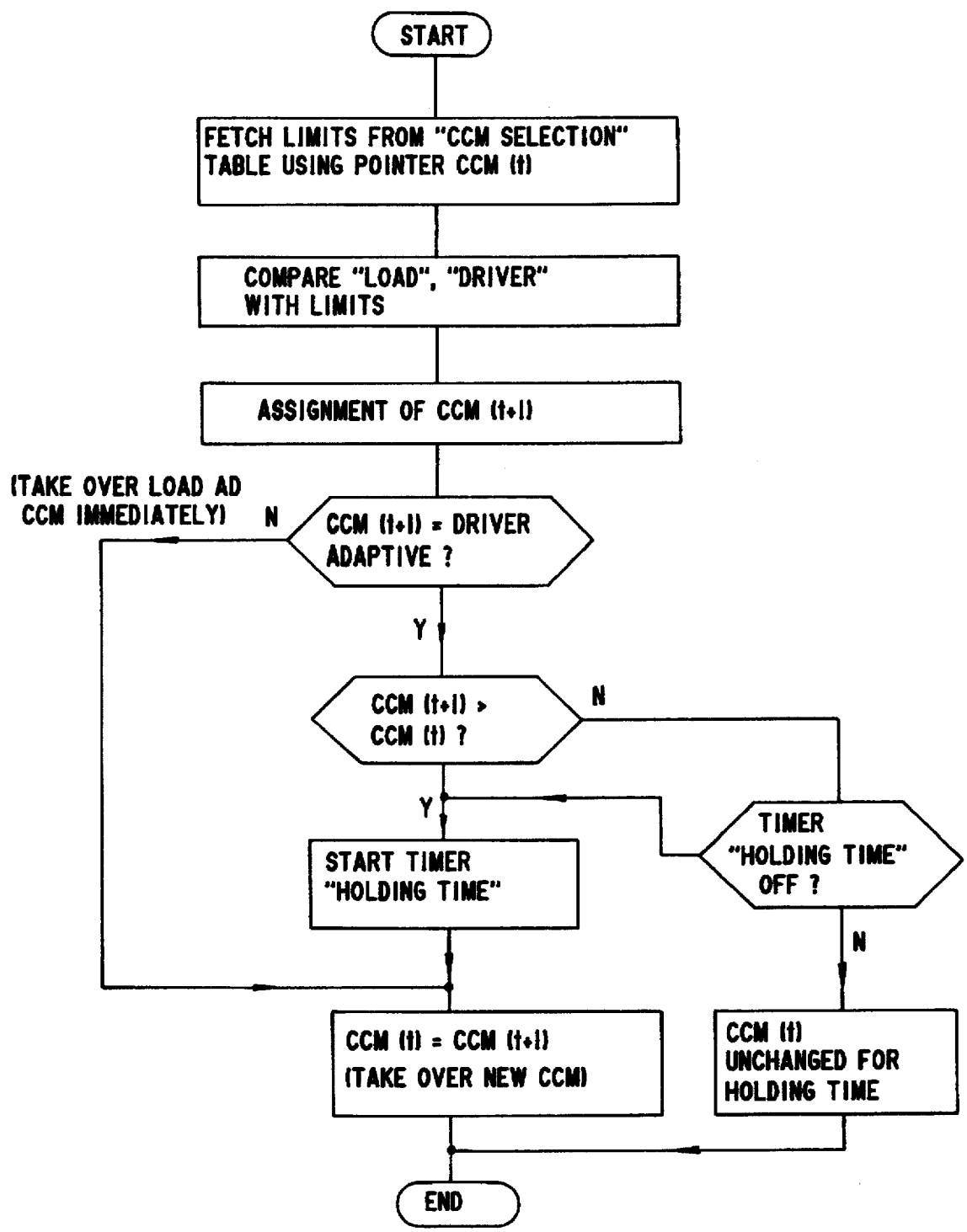

FIG. 12

| LINE | CCM (t) (OLD) | CCM (t+1) (NEW) | REQUESTED SHIFT/ ADJUSTMENT | $n_{eng}$ | $\Delta n_{ab}$ | KICK-DOWN | $\Delta dk$ | LOGIC OPERATION | RESULTING $\Delta n_{eng}$ |
|---|---|---|---|---|---|---|---|---|---|
| (1) | LOAD AD | DRIVER AD | SU | / | / | / | / | / | -DELTA_NENG1 |
| (2) | DRIVER AD | DRIVER AD | SU | ≥N_ENG_MAX 1 | ≥DELTA_NAB_SU | / | / | OR | -DELTA_NENG2 |
| (3) | ✕ | LOAD AD | SU | ≥N_ENG_MAX 2 | / | / | / | / | -DELTA_NENG3 |
| (4) | ✕ | DRIVER AD | SD | / | ≥DELTA_NAB_SD | ON | ≥DELTA_DK_SD | OR | +DELTA_NENG4 |
| (5) | ✕ | LOAD AD | SD | / | / | / | / | / | +DELTA_NENG5 |
| (6) | ✕ | DRIVER AD | SD | / | / | / | / | / | +DELTA_NENG6 |
| (7) | ✕ | DRIVER AD | SU | / | / | / | / | / | -DELTA_NENG7 |

1

CONTROLLER FOR AN AUTOMATIC MOTOR VEHICLE TRANSMISSION

CROSS-REFERENCE TO RELATED APPLICATION

This application is a Continuation of International Application Serial No. PCT/EP95/00135, filed Jan. 13, 1995.

BACKGROUND OF THE INVENTION

1. Field of the Invention

The invention relates to a controller for an automatic motor vehicle transmission having a fuzzy logic unit provided with at least one rule base, through the use of which a transmission ratio of the transmission is set with the aid of data stored in characteristic maps as a function of a gas pedal position and a vehicle speed, and through the use of which a load condition of the motor vehicle ("load") and a driving style of the driver ("driver") are taken into account when selecting the characteristic map.

In such known transmission controllers for motor vehicles, the transmission ratio of the transmission is automatically set with the aid of stored characteristic maps as a function of the gas pedal position and of the driving speed or engine speed. Moreover, in that case the load condition of the motor vehicle and the driving style of the driver are taken into account (Published European Patent Application 0 471 102 A1, German patent DE 33 41 652 C2).

In other known automatic transmission controllers (U.S. Pat. No. 4,841,815, Published European Patent Application 0 375 155 A1, and a paper by A. Takahashi, entitled: Method of Predicting Driving Environment, IFSA 1991, Brussels, pages 203 to 206), selection of the respective gear to be shifted is performed by control devices which operate according to the methods of fuzzy logic. Through the use of such logic, expert knowledge which has been obtained by experience is described in the form of a so-called rule base and is thus used for the regulating or control operations of the transmission.

SUMMARY OF THE INVENTION

It is accordingly an object of the invention to provide a controller for an automatic motor vehicle transmission, which overcomes the hereinafore-mentioned disadvantages of the heretofore-known devices of this general type, which takes account of various parameters, in particular driving dynamics acting on a transmission ratio to be set, without a high outlay, and which is comprehensible and operationally reliable. As a result, an adaptation to different vehicle types is substantially facilitated.

With the foregoing and other objects in view there is provided, in accordance with the invention, a controller for an automatic motor vehicle transmission including a fuzzy logic unit having at least one rule base for setting a transmission ratio of a transmission with the aid of data stored in characteristic maps as a function of a gas pedal position and a vehicle speed, and for taking a load condition of the motor vehicle and a driving style of a driver into account when selecting the characteristic map, the controller comprising a plurality of prescribed load-adaptive and driver-adaptive control characteristic maps or rule bases replacing the control characteristic maps, for setting the engine speed to a desired engine speed by continuous regulation of the transmission ratio; and a correction circuit being connected to the fuzzy logic unit and receiving a blocking signal from the fuzzy logic unit taking into account a dynamic driving condition of the motor vehicle for limiting adjustments of the transmission ratio, or an active adjusting signal for actively determining adjustments of the transmission ratio; the fuzzy logic unit also taking into account increased vehicle loading when setting the transmission ratio.

The advantages of the invention lie, in particular, in that it is possible for the fuzzy logic unit to take many parameters into account in a simple way, but that due to the use of stored data (for example in control characteristic maps) it is always ensured that the transmission ratio of the transmission is fixed in a tried and tested way. Moreover, the required data can be calculated in advance.

In accordance with another feature of the invention, there is provided a signal conditioning circuit connected to the fuzzy logic unit for averaging a signal reproducing the gas pedal position or throttle valve position over a prescribed period.

In accordance with a further feature of the invention, the signal conditioning circuit forms a difference of each two signals reproducing a transverse acceleration of the motor vehicle in successive time intervals and uses the difference to detect a start of cornering.

In accordance with an added feature of the invention, the signal conditioning circuit determines a frequency of adjustment of the gas pedal during a prescribed time interval and uses the frequency of adjustment to evaluate the driving style of the driver.

In accordance with an additional feature of the invention, the signal conditioning circuit forms and averages an absolute value of a difference between driving and braking forces and tractive resistances of the motor vehicle in a plane over a prescribed period to obtain a mean value, and determines a type of roadway and a loading of the motor vehicle from the mean value.

In accordance with yet another feature of the invention, the data used to control the transmission ratio are stored in characteristic maps connected to the signal conditioning circuit or are generated by another fuzzy logic unit.

In accordance with yet a further feature of the invention, the fuzzy rule base fixes or varies a characteristic map as a function of a respectively preceding characteristic map, with a first selection signal characterizing the driving style of the driver, and a second selection signal characterizing the load condition of the motor vehicle.

In accordance with yet an added feature of the invention, the fuzzy rule base fixes or varies a characteristic map as a function of a third selection signal characterizing a type of roadway being driven upon.

In accordance with yet an additional feature of the invention, a characteristic map is varied by pointwise displacement of transmission ratio value assignments.

In accordance with a concomitant feature of the invention, the fuzzy logic unit carries out adjustments of the transmission ratio slowly or only if they are reasonable for the driver.

Other features which are considered as characteristic for the invention are set forth in the appended claims.

Although the invention is illustrated and described herein as embodied in a controller for an automatic motor vehicle transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 10 is a matrix used in the transmission controller according to FIG. 2 for a control characteristic map selection;

FIG. 11 is a flowchart for the control characteristic map selection;

FIG. 12 is a table which contains conditions for approval of shifts by changing the control characteristic map;

DESCRIPTION OF THE PREFERRED EMBODIMENTS

Figure 1:
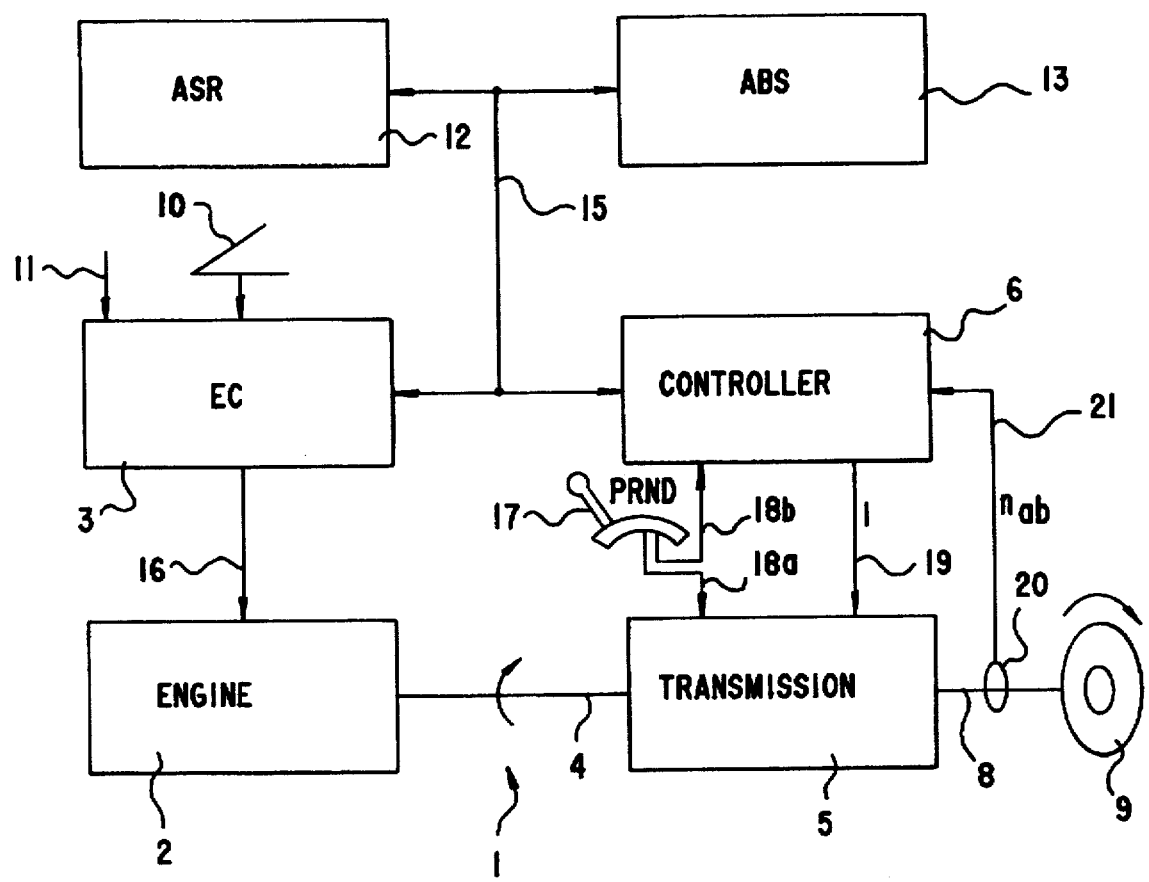
FIG. 1 is a block circuit diagram showing essential components of a motor vehicle having a transmission controller according to the invention.

Referring now to the figures of the drawings in detail and first, particularly, to FIG. 1 thereof, there is seen a motor vehicle 1 that has an engine 2 which is controlled by an engine controller 3. An engine output shaft 4 is connected through a non-illustrated torque converter with an automatic transmission 5 which is controlled by an electronic controller 6 according to the invention. Instead of a hydrodynamic torque converter, it is also possible to use hydraulic or electromagnetic clutches or mechanically operated dry clutches. A transmission 5 is constructed as a continuous transmission. A transmission output shaft 8 is connected to a driven axle of the motor vehicle, which is symbolized in this case by a driven wheel 9.

Through the use of a gas pedal 10, the driver of the motor vehicle conveys his or her commands, or strictly speaking his or her wishes, to the engine controller 3. When a non-illustrated brake pedal of the motor vehicle is operated, a braking signal which is generated, for example, by a non-illustrated stop light switch, passes through a line 11 to the engine controller 3. Moreover, the motor vehicle is provided with a wheel slip or antislip control device (ASR) 12 and an anti-skid system (ABS) 13, which are connected to one another and to the engine controller 3 and the transmission controller 6 through signal lines 15 for the purpose of exchanging signals. The engine controller 3 sends signals through a signal line 16 to the engine 2 in order to control an ignition, an injection and a throttle valve (the latter only if an appropriate control device is present).

The driver determines the driving range of the automatic transmission 5 in the usual way through the use of a selector lever 17. Selector lever signals pass through a mechanical connection 18a to the transmission 5 and through an electric signal line 18b to the controller 6. The controller 6 sends control signals through a signal line 19 to the transmission 5, in order to set a respective transmission ratio i. The speed of the transmission output shaft 8 is signaled to the controller 6 by a speed sensor 20 through a signal line 21. At least the signal lines 15, which connect the control devices 3, 6, 12 and 13 to one another, can be formed of individual lines or of a bidirectional bus, for example of a known CAN bus or LAN bus. The control devices and controllers 3, 12 and 13 need not be present. However, if they are it is advantageous that the transmission controller 6 can access the sensor signals delivered by them (for example the information on the wheel speeds) and variables derived therefrom.

The electronic controller 6 shown in FIG. 2 has the following components: a signal conditioning circuit (referred to below as a signal conditioner for short) 22, a fuzzy logic control circuit (referred to below as a fuzzy logic unit) 23, a characteristic map memory 24 having a plurality of control characteristic maps or transmission ratio tables, a control characteristic map selecting circuit (referred to below as a CCM selection for short) 25, a dynamic correction circuit 26 and a transmission ratio regulator 27. This regulator can also be built as an independent device directly onto the transmission.

A plurality of input signals which are delivered by various sensors or by the above-mentioned further control devices are conditioned in the signal conditioner 22. The input signals are converted in this case into characteristic variables, which are denoted herein as a whole as controller inputs and which can be processed by the fuzzy logic unit 23 or by other control components. As seen from top to bottom, the following measured values or parameters pass over lines indicated in FIG. 2 to the signal conditioner 22: the driver's wish or option dK, which is reflected in the position of the throttle valve or in general in the position of the gas pedal; the transmission output speed $n_{ab}$; the turbine speed nt of the torque converter; the engine torque $M_{eng}$; the engine speed or rpm $n_{eng}$; the wheel speeds $n_{Wheel\,1\ldots 4}$; and slip condition signals ("slip conditions"). As an alternative to determination from the wheel speeds, these slip conditions can also be delivered by the wheel slip control device 12 or by the anti-skid system 13. The controller 6 thus also has available operating parameters or sensor signals of other control devices if such are present.

Fuzzy controllers as such are described in the literature (see the paper by D. Abel, entitled: Fuzzy control—eine Einführung ins Unscharfe, [Fuzzy Control—an Introduction in Fuzziness] AT 39 (1991) Issue 12). Fuzzification maps the exactly determined (crisp) magnitudes of the input parameters into linguistic variables. Subsequently, the linguistic rules stored in the form of a so-called rule base are processed in an inference system, and a fuzzily formulated manipulated variable is determined. The desired system performance is fixed in these rules (see the further example below) and they are based on the knowledge of experienced experts. The manipulated variable determined by inference is converted by defuzzification into a physical manipulated variable, in general an item of "sharp" information, which then directly influences the process to be controlled as a manipulated variable.

Figure 2:
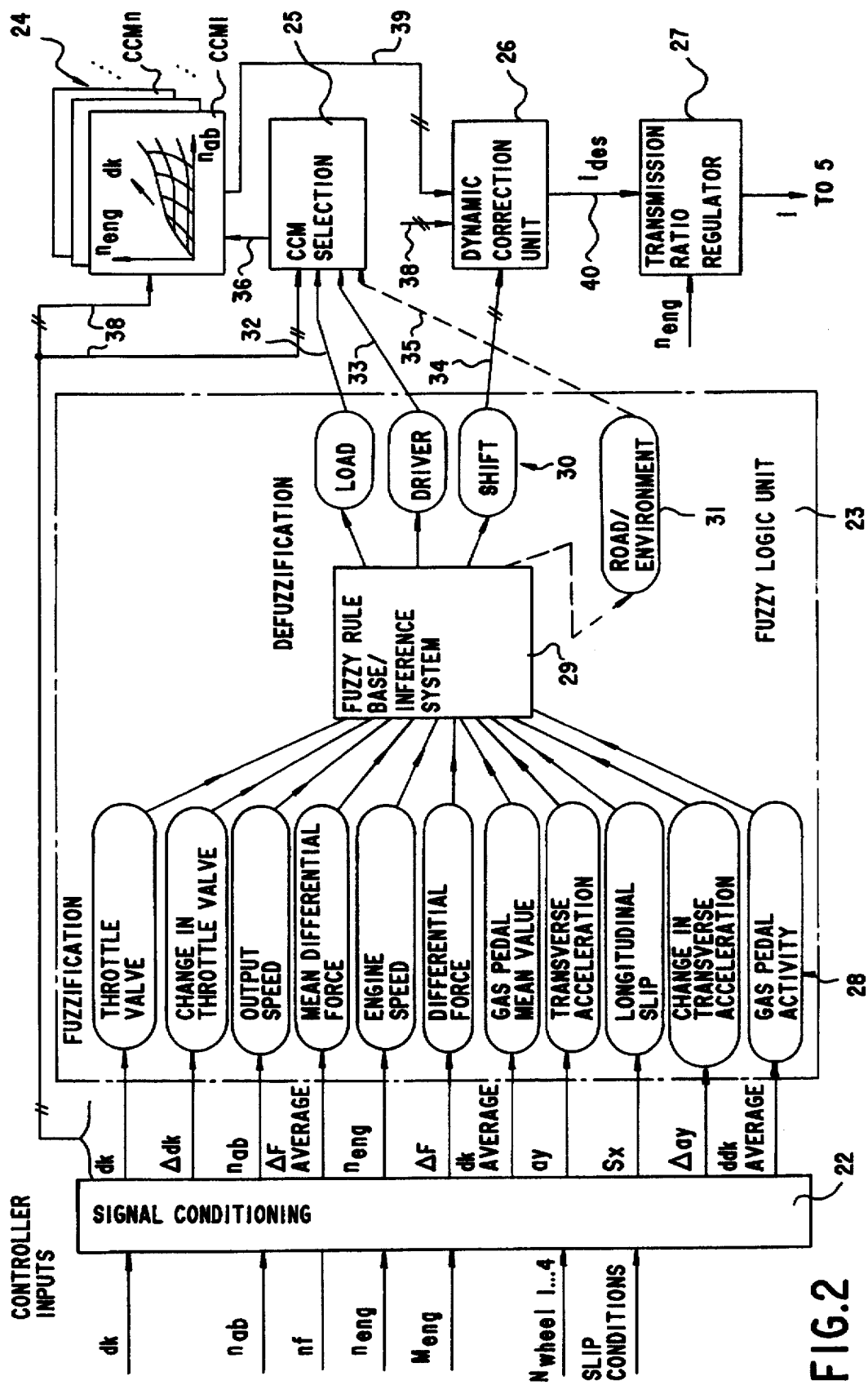
FIG. 2 is a block circuit diagram showing the transmission controller of the motor vehicle according to FIG. 1.

The measured values which are converted into continuous variables in the signal conditioner 22 of FIG. 2, as well as the derived variables, pass through lines shown in the drawing into a fuzzifier 28 of the fuzzy logic unit 23, and are converted there into linguistic variables and transmitted to an inference system 29 containing a fuzzy rule base.

Through the use of the rules defined in the rule base, the load condition of the motor vehicle is calculated, a driver recognition is carried out, that is to say it is determined whether the driving behavior of the driver is sporty or aimed at consumption, and it is finally established whether shifting up or shifting down, or in general changing the transmission ratio i, is allowed or forbidden. The fuzzy logic unit operates so to say as an expert for determining such decisive parameters.

The inference system 29 appropriately generates three signals "load", "driver" and "shift" and, as the case may be, a further signal "road/environment", which are converted in three defuzzifiers 30 that are supplemented by a further defuzzifier 31, as the case may be, into physical manipulated variables, and control the transmission ratio of the automatic transmission as output signals of the fuzzy logic unit 23. For this purpose, they pass through signal lines 32, 33, 34 and 35 to the further shift components 25 and 26 mentioned above. The line 34 is constructed as a multiple signal line or data bus.

The "load" signal and the "driver" signal and, as the case may be, the "road/environment" signal are combined with one another in the control characteristic map selection 25, and produce a "selection" signal which passes through a signal line 36 to the characteristic map memory 24 and there selects the control characteristic map which is most suitable in the respective case. Input signals of the characteristic map memory 24 are, for example, the driver's wish or option (throttle valve position dK) and the transmission output speed $n_{ab}$. It is also possible for other signals to pass as input signals from the controller inputs, which determine the desired engine speed, through a multiple signal line 38 into the control characteristic map selection 25 and into the dynamic correction circuit or unit 26. The latter can also directly determine a desired transmission ratio $i_{des}$ or a transmission speed.

The signal "load" is a measure of externally induced load conditions in the form of increased vehicle loading and/or driving on an upgrade or a downgrade, and it results in a requirement to match the shift response or the transmission ratio to the new load condition. The signal "driver" describes the driving style of the driver, which can be influenced indirectly, as well as by externally induced circumstances such as the type of the driving route (town, highway, freeway).

The classification of the driving route can also be performed by an additional rule base which delivers further information on the traffic flow (for example, stop and go traffic) and on the frequency of bends and grades (see Published European Patent Application 0 626 527 A1).

The signal "selection" generated from the signals mentioned above effects the selection of respectively suitable control characteristic maps "CCM1 to CCMn" in the characteristic map memory 24. Various possibilities exist for this purpose. In the exemplary embodiment, suitable control characteristic maps CCM1 to CCMn are selected given overshooting or undershooting of sharp limits for the signals. In this case, the matching to the external load conditions takes precedence over matching to the driving style. Another possibility is completely or partially displacing control characteristic maps, for example to higher engine speeds in the case of hill climbing.

The control characteristic maps in the characteristic map memory 24 fix a desired engine speed which is transmitted through a signal line 39 to the dynamic correction circuit 26, with the aid of the controller inputs received through the signal line 38, of the variables $n_{eng}$, dk, $n_{ab}$, and the signal "selection". As an alternative, the desired transmission ratio $i_{des}$ can also be fixed.

The fuzzy logic control circuit 23 can intervene actively through the use of the signal "shift" in the dynamic correction circuit 26 and suppress specific changes in transmission ratio (shifting up or down), or prevent any adjustment of the transmission ratio. Adjustment operations which result from the control characteristic maps are dynamically corrected by the signal "shift". An example is fast cornering. When the shift response is fixed exclusively by characteristic maps, there is frequently a shift up upon entering the bend when the driver releases the gas pedal, that is to say there is a "step up" to a higher transmission ratio, and upon leaving the bend, there is a shift down, or a "step down", when the driver presses the gas pedal again. In this case, however, these gear shifts, which impair the driving stability and the driving comfort and promote wear, are prevented. The driving dynamics condition of the motor vehicle is taken into account in an entirely general fashion when fixing the transmission ratio.

Another example is provided by slip conditions between the wheels of the motor vehicle and the roadway. Through the use of the correction circuit 26, the fuzzy logic unit 23 prevents or delays adjustments to the transmission ratio which could impair the driving stability. Moreover, when it permits an adjustment, the correction circuit 26 drives electrohydraulic actuators in the transmission 5 in such a way that a change in transmission ratio is performed only when it is reasonable for the driver. Finally, with the aid of the signal $i_{des}$ received through a signal line 40 from the correction circuit 26, the transmission ratio regulator 27 produces the required transmission ratio i and thereby controls the transmission 5. As an alternative, it can also regulate the engine speed.

The expert knowledge contained in the fuzzy rule base provides an improved driving stability and greater driving comfort. The use of control characteristic maps or of other data determined and stored in advance ensures the clarity and adaptability of the transmission controller. Many items of information were incorporated when fixing the control characteristic maps, for example the torque reserve in the case of the respective output speed and engine speed, the fuel consumption, etc., which are thereby directly available to the transmission controller. The latter is thereby relieved from the very expensive calculation of this information. Impermissibly high or low engine speeds are reliably prevented.

The programs of the fuzzy logic unit 23 are compiled with the aid of a CAE tool or tools as a program in the higher programming language C, or directly as object code. However, in addition to this layout as programs running on a microcomputer, the control circuit 23 can also be realized in hardware, for example as a peripheral unit of a computer system.

Derived variables are also computed from the input signals in the signal conditioner 22:

A gas pedal adjustment rate $\Delta dk$ is calculated from the temporal change in the cyclically sampled value of the gas pedal position dk.

A gas pedal mean value dK_mean represents the mean value over a prescribed period of the driver's wish or option dK given by the throttle valve position, and is used for the purpose of calculating the driving style, specifically in a rule base RB_driver, which is a component of the inference system 29. This mean value is calculated as follows:

$$dK\_mean,n=(\Sigma dK,n-dK\_mean,n-1)/p$$

in which:

$$\Sigma dK,n=dK*k+\Sigma dK,n-1,$$

p is the number of computing cycles until after a sudden change in dK, a new mean value is reached (for example p=256), and k is a normalization factor for evaluating the current dK value (k>1), and n is the $n^{th}$ computing cycle.

A vehicle transverse acceleration ay is calculated as follows from the wheel velocities delivered by speed or rpm sensors:

$$\alpha y = \frac{(v_{fr} - v_{fl}) * (v_{fl} + v_{fr})}{2b}$$

in which:

b=the track width on the non-driven axle, $v_{fl}$=the wheel velocity front left, and $v_{fr}$=the wheel velocity front right (respectively for rear-wheel or all-wheel drive, whereas in the case of front-wheel drive the rear wheel velocities are used).

The wheel velocities are calculated from the measured wheel speeds.

The above calculation of the transverse acceleration ay is correct only if there are no significant slip conditions. However, since other rules have higher priority than the influence of the transverse acceleration in the case of slip conditions, the loss of topicality in the transverse acceleration ay has no effect if the transverse acceleration ay is set to a replacement value given the presence of slip.

Another derived variable is the differential force $\Delta F$, which can be calculated as follows:

$$\Delta F=F_b(t)-F_{air}(t)-F_{roll}(t)-m_{Frz}*d/dt\, n_{ab}(t)-F_{br}(t)$$

in which:

$F_b(t)$=the tractive force $F_{air}(t)$=the air resistance $F_{roll}(t)$=the rolling resistance $m_{Frz} * d/dt\, n_{ab}(t)$=the acceleration resistance and $F_{br}(t)$=the braking force $\Delta F$ represents the balance of the forces acting on the motor vehicle at the transmission output. When level, it must be equal to zero without an external load, for example a payload or trailer operation. If it is not, it is possible therefrom to detect an increased vehicle mass, a road gradient and/or an external load (payload, trailer operation, etc.).

A mean differential force $\Delta F\_mean$ is a measure of the road upgrade or downgrade and/or the vehicle loading. It represents the mean value of the differential force $\Delta F$ in a time interval z. It is possible, for example, through the use of it to detect a very hilly or mountainous driving route and/or an increased vehicle loading, and to ensure an appropriate response of the transmission through the use of a rule base RB_load even over a relatively long time. As a result, for example, a load-adaptive control characteristic map is maintained after a long upgrade, that is to say subsequent shifting up is prohibited. A lower transmission ratio with a better motor braking effect is then available in the subsequent downhill drive. Thus, superfluous stepping up and stepping down is avoided in the case of a hilly highway with the aim of using the same transmission ratio downhill and uphill.

It is also possible with the aid of the mean differential force to detect driving on a pass through the use of a rule base RB_road of the inference system 29. The calculation of the mean differential force is as follows:

$$\Delta F\_mean,n=(\Sigma\Delta F,n-\Delta F\_mean,n-1)/p$$

in which:

$$\Sigma\Delta F,n=k*|\Delta F|+\Sigma\Delta F,n-1,$$

k is a normalization factor for evaluating the absolute value of the current differential force, n is the computing cycle, and p is the number of computing cycles until a new mean value is reached after a sudden change in $|\Delta F|$ (for example p=256).

A gas pedal activity $ddK\_mean$ represents the frequency of the adjustment of the gas pedal dK in an interval z, and is calculated as follows:

$$ddK\_mean,n=(\Sigma ddK\_mean,n-ddK\_mean,n-1)/p$$

it being the case that $\Sigma ddK\_mean,n=k*|\Delta dK|+\Sigma ddk\_mean,n-1$.

The above holds equally for k, n and p. $\Delta dk$ represents the gas pedal adjustment rate.

The above calculations of the mean differential force and the gas pedal activity correspond to a simplified sliding averaging.

If the braking force can be delivered by an ABS control device or an appropriate sensor, the equation above can be used to calculate a useful value for the differential force. If the braking force is not delivered, this must be taken into account in the case of braking.

As mentioned, the wheel speeds are used to calculate the transverse acceleration and the wheel slip. In this process, even small speed differences can lead to significant values of the calculated variables. It is therefore necessary to detect and to correct erroneous calculations by changing the circumference of one or more wheels, for example by a tire change or by fitting snow chains. Otherwise, shifting up in the event of detected cornering, for example, would be erroneously blocked because of high transverse acceleration. That can be prevented as follows: after restarting the transmission control device 6, that is to say after switching on the ignition, the calculated transverse acceleration must be below a limiting value for a prescribed time. Otherwise, it is set equal to zero for the duration of the current operating cycle.

It is presumed in this case that, for example, for two minutes after restarting, a driver does not immediately drive continuously with a high transverse acceleration of constant sign. If, by contrast, the case occurs in which the transverse acceleration overshoots the limiting value only briefly and then drops again to a low value, it is regarded as plausible and adopted for the control.

The output signals "load" and "driver" and, as the case may be, "road/environment" of the fuzzy logic unit 23 and the control characteristic map CCM(t) being active at an instant t determine the control characteristic map at the subsequent instant CCM(t+1). In this case, the cycle time is approximately 20 ms. The control characteristic maps stored in the characteristic map memory 24 are tuned to one another. In the present exemplary embodiment, there are three driver-adaptive control characteristic maps E ("economy"), M ("medium") and S ("sport") and two load-adaptive control characteristic maps SA ("semi-adaptive") and A ("adaptive"). In the case of the driver-adaptive control characteristic maps, shifting up is performed in the case of from E through M to S with increasing dependence on the output speed $n_{ab}$. The control characteristic map SA effects only stepping down in the case of average vehicle speed or output speed.

The effect of a continuous transmission in conjunction with the engine is described briefly below, after which the structure of the control characteristic maps will be explained.

Figure 3:
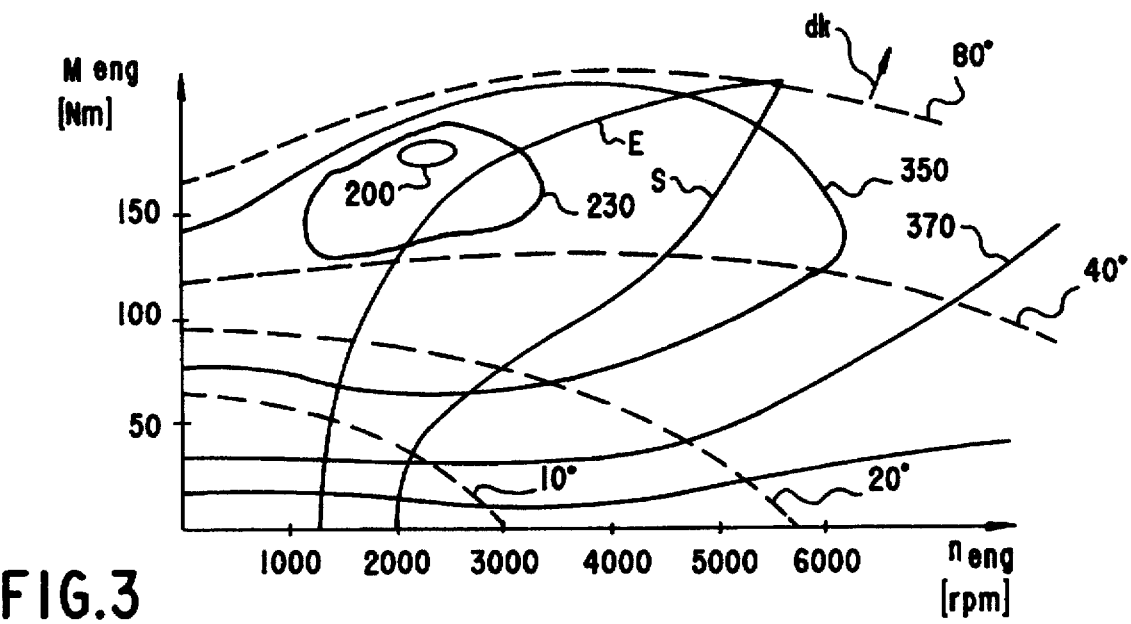
FIGS. 3 to 6 are diagrams showing examples of control characteristic maps of the transmission controller according to FIG. 2.

FIG. 3 reproduces the typical behavior of an Otto (spark-ignition) engine. The closed curves show the specific consumption in g/kWh as a function of the operating points of engine speed $n_{eng}$ and engine torque $M_{eng}$. It is seen that the efficiency rises in a region which becomes ever smaller.

The dashed lines represent the output engine torque as a function of the engine speed and of the throttle valve position dK as parameters. It emerges clearly that the requirement to operate the engine in regions of the lowest specific consumption can be fulfilled more effectively through the use of a continuous transmission than through the use of a transmission with fixed transmission steps. The engine speed can be set independently of the output speed of the transmission by continuous adjustment of the transmission ratio.

However, control characteristics such as, for example, an "economy" control characteristic E in FIG. 3, oppose optimization of the driving performance. A "sport" control characteristic S permits an equal engine output for a smaller throttle valve angle and a higher driving performance can be achieved by the higher transmission ratio (corresponding to a "lower gear"). In this case, automatic matching through the use of selecting different strategies when setting the transmission ratio effects a response which meets the need. It is only the throttle valve or gas pedal position dK, reproducing the driver's wish or option, which serves as an input parameter for the control characteristics E and S. The engine speed to be set is determined therefrom with the aid of FIG. 3.

Figure 4:
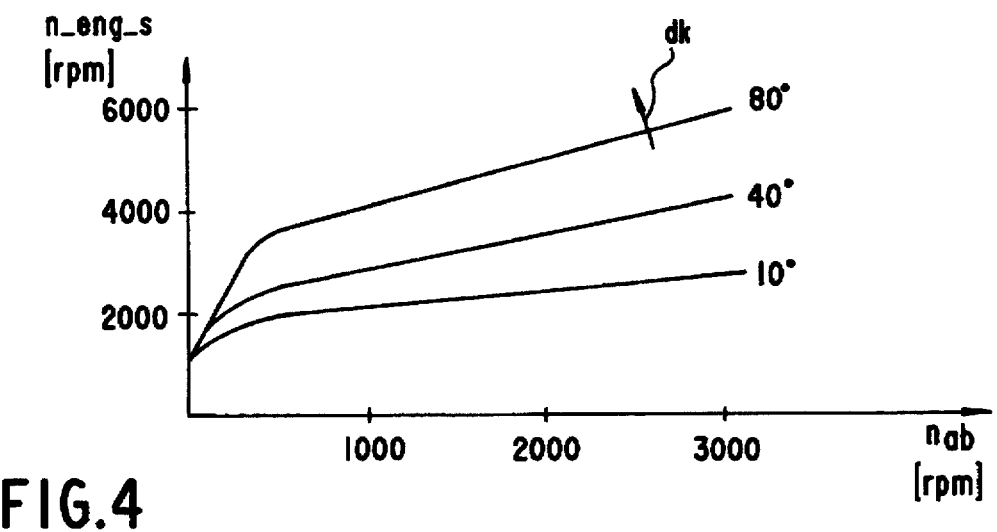
Figure 5:
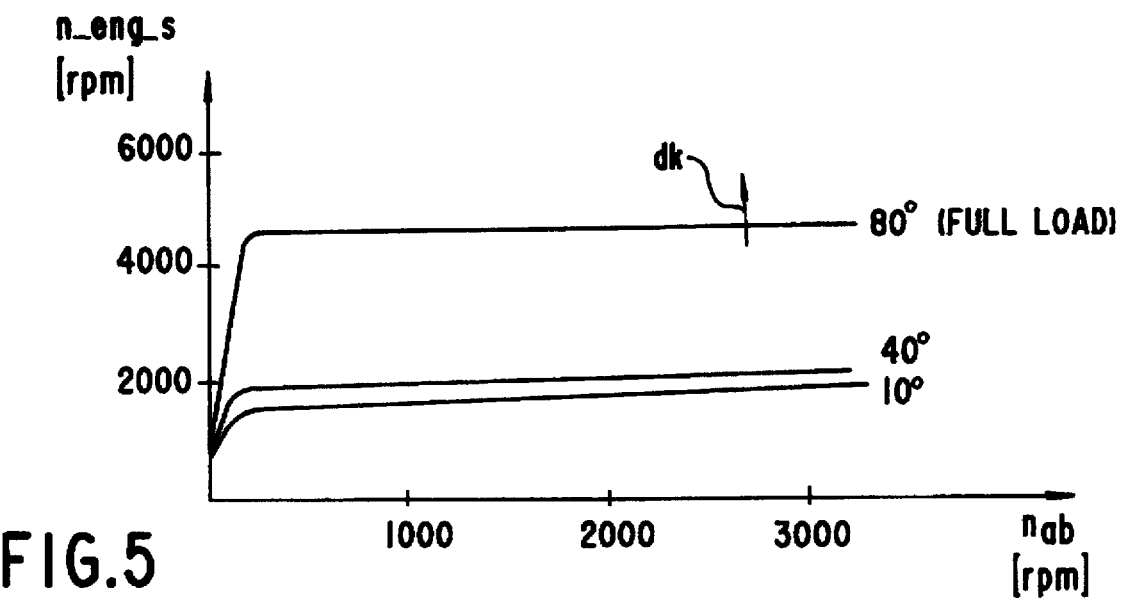

Further dependencies of the operating parameters of the motor vehicle can be represented by control characteristic maps. In the case of driver-adaptive control characteristic maps, the transmission ratio or the engine speed is set in such a way that in the case of a driving style emphasizing performance, the engine speed is coupled more closely to the vehicle speed. A more intense experience of acceleration is thereby produced for the driver. This may be seen from the diagram in FIG. 4, in which the desired engine speed n_eng_s is represented as a function of the output speed $n_{ab}$, with the throttle valve position dK as a parameter. By contrast, in the case of a moderate driving style, the engine operating point remains in regions of low consumption, except in the case of full-load operation or kick-down operation, which follows from the diagram in FIG. 5, that is a representation corresponding to that of FIG. 4.

In the case of significant values of the signal "load", for example during hill climbing, the transmission ratio must be set in such a way that sufficient torque is available at the transmission output for acceleration processes, since after all a portion of the overall torque is required for driving uphill. As in the case of a performance-oriented driving style, this can be performed by selecting a higher engine speed in conjunction with a lower transmission ratio. The desired engine speed n_eng_s in this case is a function of the throttle valve position dK and of the absolute value of the differential torque |m_diff|, as may be seen from the diagram in FIG. 6. The formation of the absolute value ensures an identical response when driving uphill and downhill.

Other dependencies of the engine operating conditions can also be taken into account, for example on the throttle valve position dK and on the "load" signal. For this purpose, the characteristic map memory 24 of FIG. 2 receives all of the controller inputs as input signals through the signal line 38.

A further optimization criterion for a control characteristic map is the minimization of the exhaust gas emissions. With a control characteristic map configured in such a way, the engine is then operated in an appropriate operating region, with care being taken to ensure operating conditions that are as stable as possible so that the exhaust gas control can operate under the most favorable conditions. An example of a region to be avoided in this process, since it is associated with relatively high emissions of hydrocarbons (HC), is engine operation at low load (dK) in conjunction with a relatively high engine speed (from about 4000 rpm).

Such an operational performance is important, in particular, in urban traffic and a description will be given below of an example with the input signals dK, $n_{ab}$, "load" and "driver". A further fuzzy logic unit with a rule base, which replaces the characteristic map memory 24, is used to determine a desired engine speed from the input variables dK, $n_{ab}$, "load" and "driver", for example. The advantages of the fuzzy method become plain in this case, specifically the possibility of combining a plurality of items of information through rules in such a way that they yield a clear overall response of the controlled device. The conclusions drawn from the rules can be varied in this case. The further fuzzy logic unit is not represented, since it corresponds to the fuzzy logic unit 23. The response of a fuzzy system constructed with the aid of CAE (Computer Aided Engineering) tools can be represented graphically in a clear fashion, as is seen from FIGS. 7, 8 and 9. In these figures, the engine torque and the output speed are represented in three dimensions as a function of the throttle valve position or the "load" signal.

The rules of the rule base are as follows in this case:

Rule 1:

IF $n_{ab}$ IS very low OR dK IS low THEN n_eng_s=very low

Rule 2:

IF dK IS medium THEN n_eng_s=medium

Rule 3:

If dK IS very high THEN n_eng_s=very high

Figure 7:
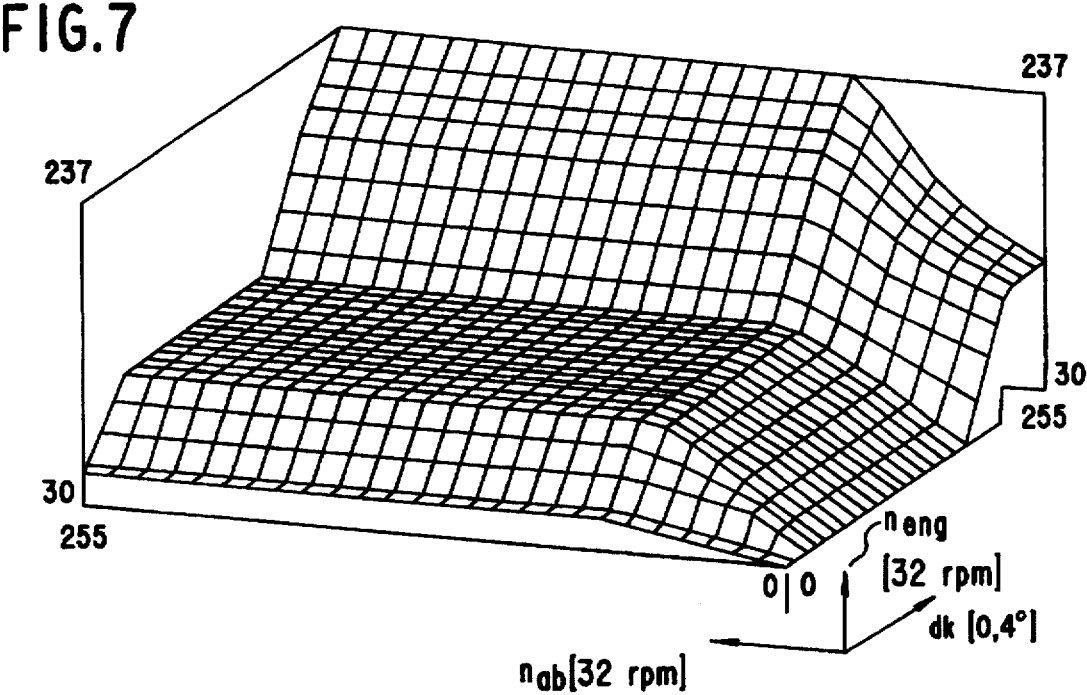
FIGS. 7 to 9 are three-dimensional representations of control characteristic maps of the transmission controller according to FIG. 2.

It is possible in this way to achieve a response as represented in FIG. 7. Like FIGS. 8 and 9, this figure was produced by using the CAE tool, and the fuzzy system that is constructed can be analyzed by using such representations before it is implemented in the electronic controller 6 shown in FIG. 1. It is evident that a response is achieved in this case which is similar to the case of the control characteristic map according to FIG. 5: in a large region the engine is prescribed an operational performance which yields the smallest possible consumption. The response of the driver can be taken into account by an additional rule:

Rule 4:

IF $n_{ab}$ IS high AND dK IS high AND driver IS high THEN n_eng_s=high

Figure 8:
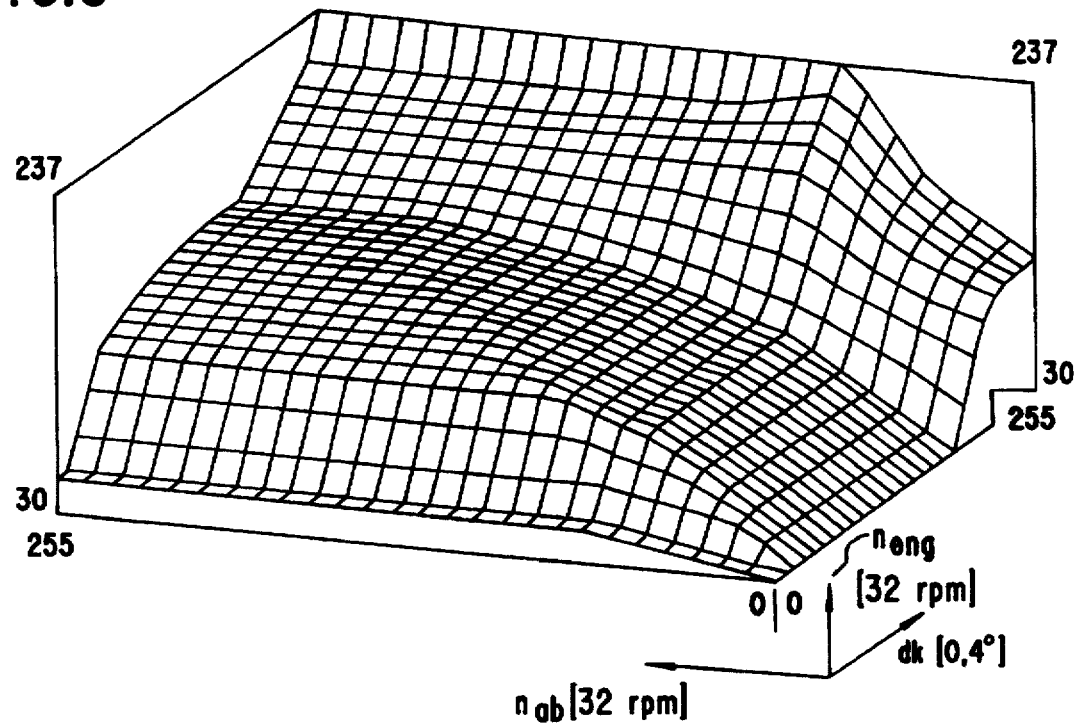

The result of this is a dependence of the desired engine speed n_eng_s on the output speed $n_{ab}$ and the throttle valve position dK, as is represented in FIG. 8. In this case, the desired engine speed is more strongly linked to the output speed in the case of a performance-oriented driving style. Moreover, the speed level of the engine is raised in general (also compare FIG. 4). By contrast, the response of the diagram according to FIG. 7 holds for small values of the signal "driver".

If an externally induced load condition is indicated by high values of the signal "load", this can be converted by using the following rule:

Rule 5:

IF load IS positive THEN n_eng_s=high

Figure 9:
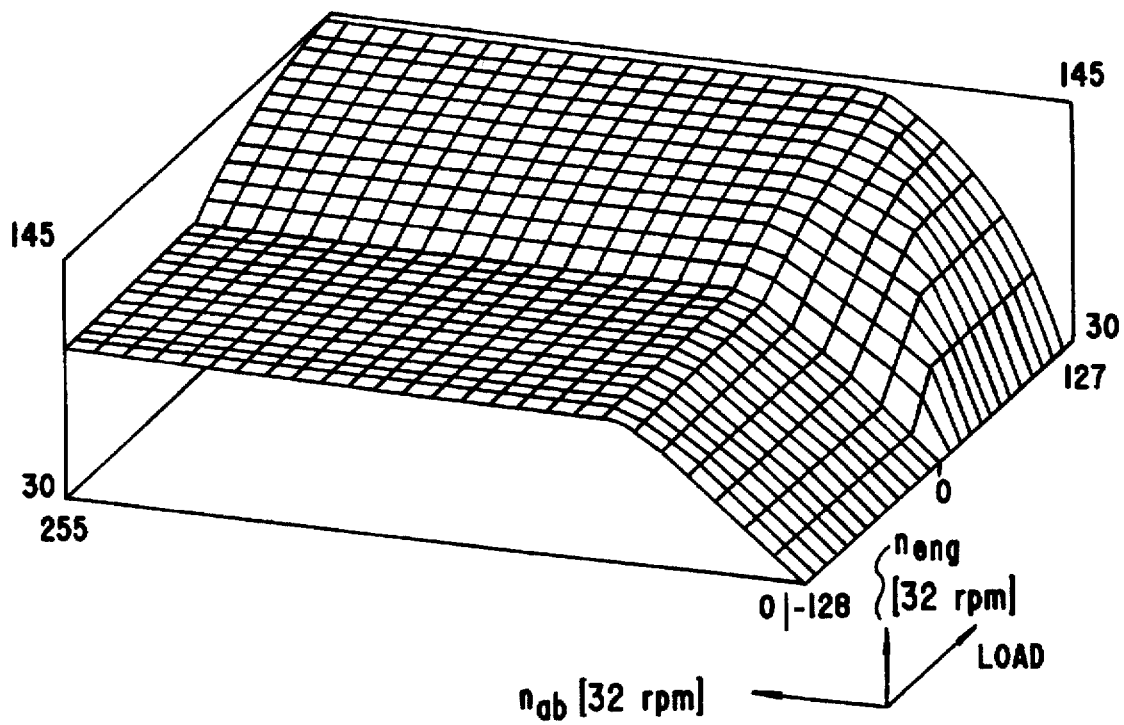

If this rule becomes active with an increasing positive value of the signal "load", n_eng_s rises. This is the case for hill climbing (also compare FIG. 6), with a small value of the signal "driver" being used as a basis. The result is represented in FIG. 9.

The examples explained above show that a rule-oriented functional approach in accordance with the fuzzy method can be used to realize control quickly and simply. If, by contrast with this, control characteristic maps are prescribed, the latter must be defined in a pointwise fashion accompanied by a relatively large outlay of time. Moreover, the fuzzy logic control circuit 23 is consistently developed with the examples described in such a way that the signals "load" and "driver" in the form of multi-valued information have a continuous effect on the resulting desired engine speed. Thus, for example, different values of the signal "driver" effect a response which is between the representations according to FIGS. 7 and 8.

If, by contrast, precalculated control characteristic maps are used, they are to be selected by the CCM selection 25. This selection of the control characteristic maps is described below:

If a driver-adaptive control characteristic map has been changed, it remains active without change for a prescribed holding time in order to avoid frequent shifting due to fluctuations in the selection signals. However, a control characteristic map oriented toward driving performance always prevails immediately against a more economic control characteristic map in order, for example, to immediately make the required acceleration available to the driver by a suitable shift response of the transmission (also see FIG. 11) during an overtaking process. The duration of the holding time can be made dependent on the response of the driver in order, for example, to effect longer holding times upon activation of the S control characteristic map in the case of a very high performance requirement, that is to say in the case of a large signal "driver". However, functional relationships of this type depend on the engine, the body and the transmission of the respective type of motor vehicle.

The matrix seen in FIG. 10 contains the conditions which must be fulfilled, for example, by the output signals "driver" and "load" of the fuzzy logic unit 23 in order to pass over from an "old" control characteristic map, (left-hand column), that is to say one which has been used at a given instant t, to a "new" one at an instant t+1. The variables em, ms, xta, xa, me, sm, tax and ax are prescribable limiting values for the two signals "driver" and "load". The symbol Λ represents an AND operation.

In order, for example, to change from a driver-adaptive E control characteristic map to a load-adaptive, semi-adaptive SA control characteristic map, the signal "load" must be larger than a limiting value xta, and the signal "driver" must be smaller than a limiting value ms. A change from the S control characteristic map to the SA control characteristic map is not permitted, since the sporty S control characteristic map also fulfills the conditions for driving on roads with moderate upgrades, for which the semi-adaptive control characteristic map is provided.

It is possible, on one hand, to use more than five control characteristic maps having respectively finer graduation, but the output signals of the fuzzy logic unit 23 can also be used for the purpose of changing one or a few basic characteristic maps. For this purpose, the signal "driver" and, as the case may be, the signal "load" shift the characteristic maps or change them, as is to be seen from FIGS. 4 to 6. Thus, in the case of a performance-oriented driving style, for example, dependence of the engine speed on the output speed of the transmission is intensified. As a result, the number of required basic characteristic maps and the outlay upon selecting individual characteristic maps can be reduced.

The limiting values in the matrix of FIG. 10 are determined in road tests. They must have a prescribed hysteresis between the activation and abandonment of a control characteristic map. Thus, for example, the limiting value em for the change from the E control characteristic map to the M control characteristic map is larger than the limiting value me for the return from the M control characteristic map to the E control characteristic map: em>me.

Furthermore, for specific driving maneuvers, for example during hill climbing, the activation limiting values can be changed, for example those for the S control characteristic map can be increased, because the signal "driver" must be more weakly evaluated in the case of hill climbing.

A general advantage of fuzzy logic becomes evident in this case, namely that a variable evaluation of the input variables is undertaken which permits different conclusions. For example, if the signal "driver" has a very high value there is a short-term performance requirement of the driver, for example during overtaking. This quantitative evaluation is undertaken by the fuzzy logic unit and can be used as such in particular.

The matrix according to FIG. 10 can be realized technically by a computer with an appropriate program which processes appropriate inquiries and jumps or has a table which is addressed as a function of the current control characteristic map CCM (t). The computer then extracts the activation limiting values and the type of comparison (">" or "<") from the table and fixes the new control characteristic map to be activated by comparing the signals "driver" and "load" with the limiting values from the table. The entire flow chart of the operations carried out in this process is represented in FIG. 11. This flow chart is self-explanatory.

The transmission controller 6 according to the invention uses its correction circuit 26 to carry out a dynamic correction, accompanied by adjustment matching when changing the control characteristic map, as follows. With the aid of the active control characteristic map CCM (t) the new desired engine speed n_eng_s is determined as input in the characteristic map memory 24 of FIG. 2 from the signals dK and $n_{ab}$, for example.

It has become clear that it is impermissible to pass this input on immediately to the transmission ratio regulator 27. Adjustments of the desired engine speed n_eng_s which are produced by the change of the driver-adaptive control characteristic map can be felt as being disturbing because they are not connected to an action or environmental condition which can be detected by the driver (so-called unmotivated shifting). An "adjustment matching by changing the control characteristic map" takes place in these cases, and it is possible thereby for such adjustments or changes in the transmission ratio to be carried out slowly or introduced quickly in conjunction with a driving maneuver in which they seem plausible to the driver (for example shifting down by changing to a load-adaptive control characteristic map when starting on a hill). Driving maneuvers which make shifting up plausible are, for example, a high engine speed. The cases of permitting adjustments by changing the control characteristic map are summarized in the table of FIG. 12.

Row 1 of this table, for example, treats the case in which the motor vehicle finishes a hill climb and the transmission controller therefore switches from a load-adaptive to a driver-adaptive control characteristic map, as a result of which the new desired engine speed is reduced. However, the new desired engine speed n_eng_s (t+1) is not realized immediately as a speed jump, but instead the engine speed is continuously brought up to the new speed at a rate of change DELTA_NENG1 (with the unit rpm/min/s). The change can be carried out not only as a function of time, but also as a function of operating parameters such as the distance covered or the acceleration.

Row 4 of FIG. 12 treats the case in which a shift down, that is to say an increase in the engine speed, is performed by changing to a driver-adaptive control characteristic map. If prescribed conditions are fulfilled in this case, such as, for example, pressing the gas pedal down quickly, (that is to say $\Delta dK \geq DK\_RS$), or if a kickdown command has been given, shifting down is performed more quickly, specifically at a rate of change DELTA_NENG4. Otherwise, it proceeds at a rate of change DELTA_NENG6 which is lower, that is to say shifting down takes place more slowly (see row 6).

A further simplification and improvement of the functions described above is achieved when a possibly corrected, desired engine speed n_eng_s(t) is calculated from the previous control characteristic map CCM(t) and is compared with a new desired engine speed n_eng_s(t+1) which is calculated from the new control characteristic map CCM (t+1). If the comparison yields identical values, the new values and the change, associated therewith, of the control characteristic maps are permitted.

Figure 13:
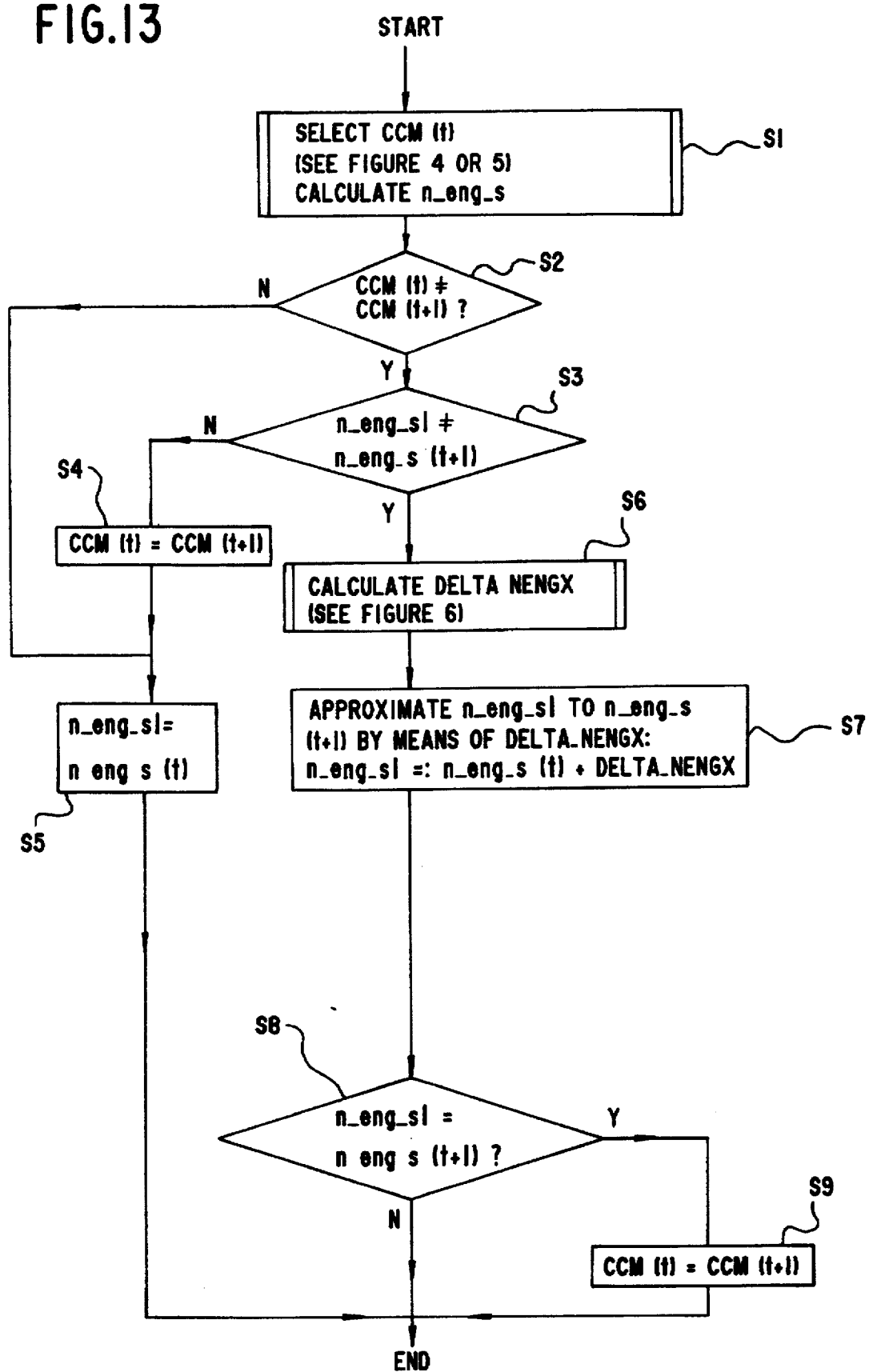
FIG. 13 is a flowchart in accordance with which a dynamic correction of the transmission ratio is carried out.

FIG. 13 shows a flow diagram according to which the above-described dynamic correction of the transmission ratio is carried out.

After starting the program, a control characteristic map CCM(t) is selected at the instant t in a block S1, specifically as described with the aid of FIGS. 10 and 11. Thereafter, the desired engine speed n_eng_s is calculated.

An interrogation is made in a step S2 as to whether or not the control characteristic map at the instant t is different from the control characteristic map at the instant t+1. The procedure continues with a step S5 if it is not, and with a step S3 if it is.

An interrogation is made in the step S3 as to whether or not the current desired engine speed is different from the desired engine speed at the instant t+1. The procedure continues with a step S4 if it is not, and with a step S6 if it is.

The subsequent desired engine speed n_eng_s1 is set equal to the desired engine speed at the instant t n_eng_s (t) in the step S5.

Figure 6:
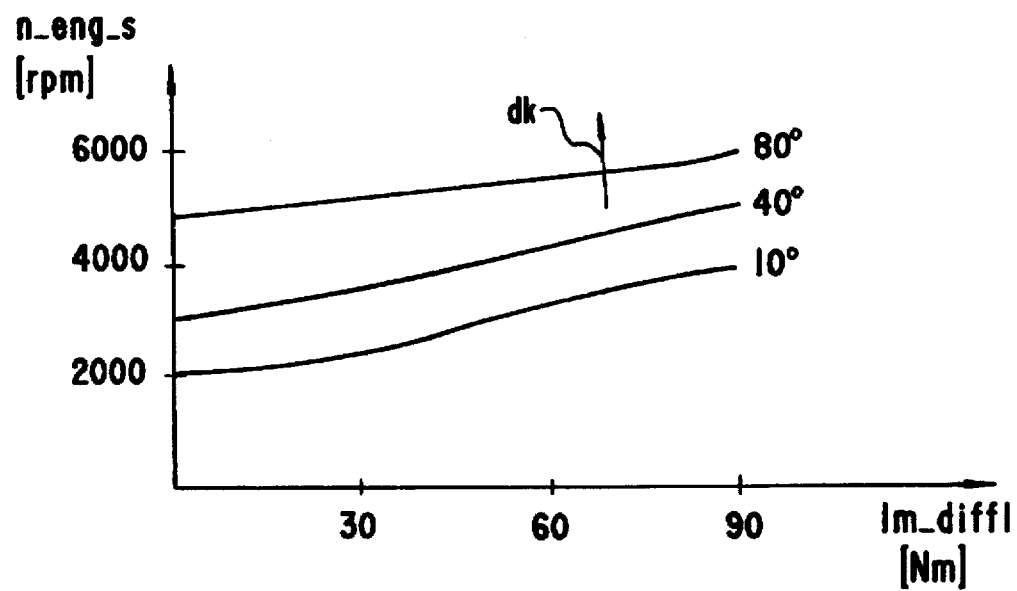

The engine speed difference DELTA_NENGX in accordance with the diagram in FIG. 6 is calculated in the step S6.

The corrected desired engine speed n_eng_s1 is approximated in a step S7 to the desired engine speed at the instant t+1 with the speed difference DELTA_NENGX (compare FIG. 12):

$$n\_eng\_s1 = n\_eng\_s\ (t) + DELTA\_NENGX.$$

An interrogation is made in a step S8 as to whether or not the desired engine speed to be set is equal to the desired engine speed at the instant t+1. If it is, then:

In a step S9 the control characteristic map CCM(t) at the instant t is set equal to the control characteristic map CCM(t+1) at the instant t+1, that is to say a change is made to the new control characteristic map.

The program is terminated thereafter or after the interrogation in the step S8 if the interrogation is answered with no.

The value determined for the desired engine speed n_eng_s1 to be set in accordance with the program according to FIG. 13 is, as the case may be, recorrected in the dynamic correction circuit 26.

The characteristic map memory 24 and the control characteristic map selecting circuit 25 are used to calculate a desired engine speed which largely corresponds to the criteria of stationary operation. A desired engine speed n_eng_s1 that is initially determined in the correction circuit is converted in a step S10 shown in FIG. 14 into a first corrected desired transmission ratio i_s1. In the further sequence, the latter is subjected to correction by a relative change di and by an absolute correction value i_cor, unless the driver prescribes the maximum correction by a kickdown command KD. This is interrogated in a step S11.

If the answer to the interrogation is yes, in a step S12 a subsequent corrected transmission ratio i_s3 is set equal to the first transmission ratio i_s1 and the program is exited.

In order for the relative correction value di to become effective, it must be above a threshold value IGR. This is interrogated in a step S13.

If di is not above this threshold value, a second desired transmission ratio i_s2 is set equal to the first desired transmission ratio i_s1, and the first desired transmission ratio is set equal to 0 at an instant to (step S14).

If the correction value di is above the threshold value IGR for the first time in the course of a driving maneuver, an interrogation is made in a step S15 as to whether or not the current desired transmission ratio i_s1 ($t_0$) is equal to 0. If it is, it is set equal to a first value of the desired transmission ratio i_s1 (step S16).

The current desired transmission ratio then serves as a basis for adjusting the transmission ratio through the use of a relative correction value which is calculated as follows (step S17):

$$di\_s2 = \frac{i - s1(t_0) \cdot k}{di} \qquad (I)$$

Starting from an initial instant to, the correction value di_s2 fixes how strongly the desired initial transmission ratio i_s (to) may still change. If, for example, the constant k=5 and di=10, the correction value di_s2=i_s1 (to)*0.5. In this case, this represents the variation which is still permitted about the desired initial value i_s1 (t0).

The above processes are illustrated in FIG. 15 with the aid of a driving maneuver. The transverse acceleration ay which permits cornering to be detected is represented in the diagram A). Also typical is the setting dk of the gas pedal by the driver, who slackens the gas pedal in the bend (diagram B). The result is a lowering of the desired engine speed n_eng_s2, because the operating point of the engine changes in the control characteristic map, for example according to FIG. 10 or 11. The desired transmission ratio i_s1 (t)=n_eng_s1/$n_{ab}$ resulting therefrom changes correspondingly (diagram D).

This driving maneuver is detected by the fuzzy logic unit 23, and a corresponding correction value di is output (diagram C). The transmission ratio i_s1 (to) is stored at the instant to. Around this transmission ratio equation I yields a region in which the corrected transmission ratio lies (diagram D). If i_s2 lies outside this region (step S18 in FIG. 14), a resulting transmission ratio $i\_s3=i\_s2-di\_s2$ is determined (steps S20 and S21 of FIG. 14) and actually set. The variation in the resulting corrected transmission ratio i_s3 is represented in diagram E against time t. The time t is also plotted, as the abscissa, in each case in diagrams A) to D). In this case, the correction value i_cor in step S21 of FIG. 14 is assumed to be equal to zero.

It becomes clear that excessively frequent changes between shifting up and shifting down of the desired transmission ratio i_s1(t) are weakened in this case. It is also possible by changing the fuzzy rule base to strengthen the intervention in the change in the transmission ratio by a larger correction value di. As a result, the transmission ratio can be fixed in the case of such driving maneuvers. The function can thus be dimensioned as desired by changing the correction value di, which harmonizes very well with the characteristics of the fuzzy logic unit. The program explained with the aid of FIG. 14 yields, as it were, a relative adjustment intervention. Apart from the case of the cornering explained herein, this function of fixing the transmission ratio is also expedient in coasting or when the motor vehicle is driving downhill, since fixing the transmission ratio generates an engine braking effect.

Figure 14:
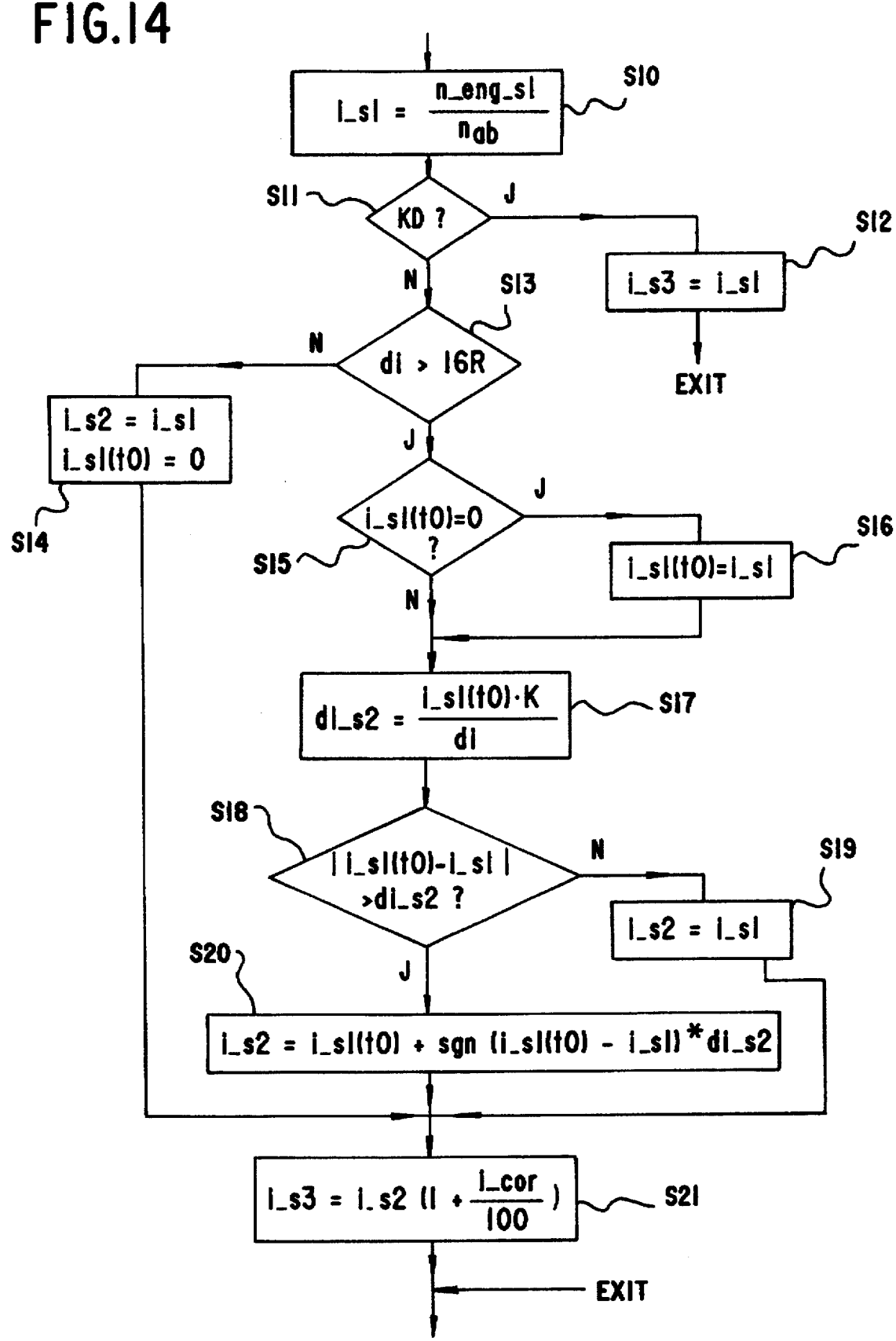
FIG. 14 is a flowchart for a further dynamic correction of the transmission ratio by a fuzzy logic unit.
Figure 15A:
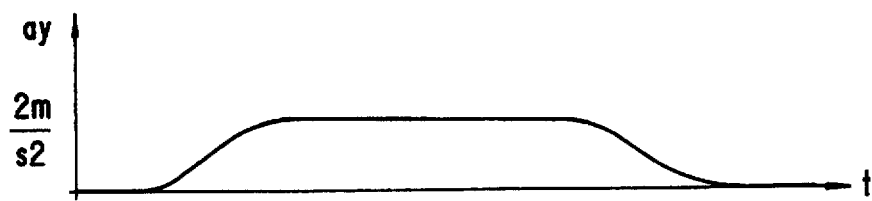
FIG. 15 is a group of diagrams showing a driving maneuver for the purpose of explaining the dynamic correction of the transmission ratio.
Figure 15B:
Figure 15C:
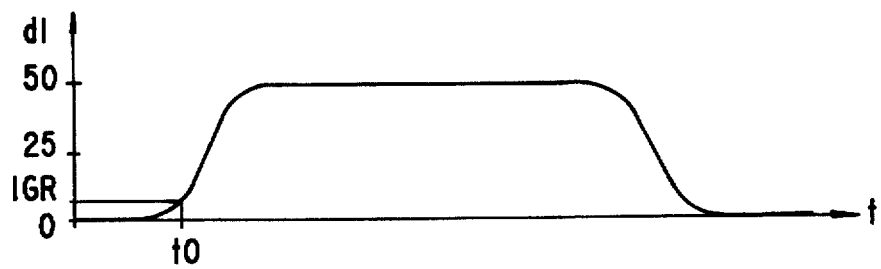
Figure 15D:
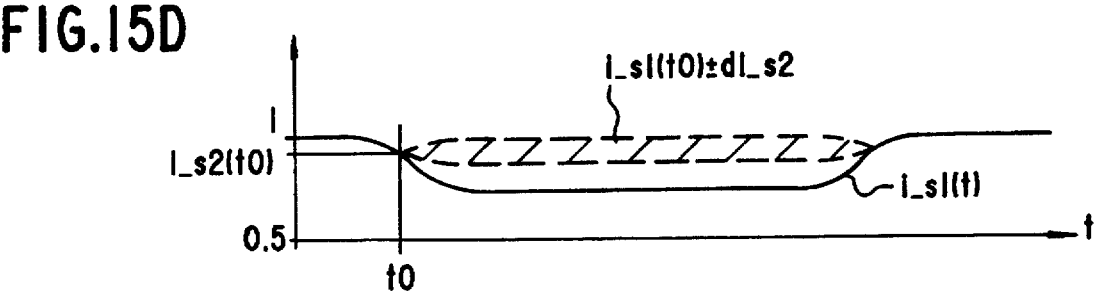
Figure 15E:
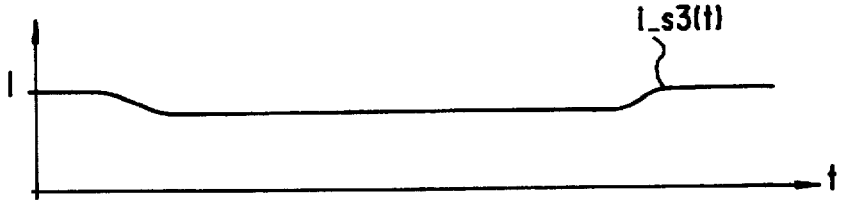

Moreover, the transmission i_s2 can still be corrected by an "absolute adjustment intervention" using the correction value i_cor (step S21 in FIG. 14). The correction variable i_cor can, for example, assume values of −50 to +50, as a result of which the transmission ratio i_s2 changes by ±50%. It is thus also possible to correspondingly influence the output torque at the transmission output. This is particularly useful when significant slip conditions are indicated at the driving wheels by a long slip signal Sx. In this case, the engine torque can be influenced additionally through an intervention signal transmitted to the engine controller 3. The engine controller thereupon reduces the engine torque, for example by adjusting the ignition or the throttle valve or by shutting down a cylinder.

It can be advantageous in other cases to increase the engine torque briefly. Thus, in the case of quick smoothing of the transmission ratio of continuous transmissions, an effect which is known is that the engine speed drops briefly, that is to say for 0.5 to 1.5 s, because the transmission requires a lot of torque for the adjustment process. This effect is particularly disturbing because, after all, such an adjustment mostly introduces an acceleration process. If, in this case, the transmission controller 6 then transmits to the engine controller 3 an intervention signal which increases the engine torque, the disturbing brief drop in speed and the loss in acceleration associated therewith are prevented.

Other reasons for an absolute adjustment intervention can be commands of an anti-skid system ABS or an anti-slip control system ASR. In the first case, the transmission ratio is adjusted in such a way that a drag torque which is as small as possible occurs at the driving wheels. The anti-slip control system can adjust the transmission ratio in such a way that the wheel slip of the driving wheels is reduced.

In accordance with the respective input, the transmission ratio regulator 27 of FIG. 2 sets the engine speed n_eng in accordance with the relationship $n\_eng=i\_s3*n_{ab}$.

At least one actuator which is required for this purpose includes, for example, a known valve that influences the transmission ratio.

I claim:
1. In a controller for an automatic motor vehicle transmission including a fuzzy logic unit having at least one rule base:
   for setting a transmission ratio of the automatic motor vehicle transmission with the aid of data stored in characteristic maps as a function of a gas pedal position and a vehicle speed, and
   for taking a load condition of a motor vehicle and a driving style of a driver into account when selecting one of the characteristic maps, the improvement comprising:
   one of rule bases and a plurality of prescribed load-adaptive and driver-adaptive control characteristic maps replacing the control characteristic maps, for setting an engine speed to a desired engine speed by continuous regulation of the transmission ratio; and
   a correction circuit being connected to the fuzzy logic unit and selectively receiving a blocking signal from the fuzzy logic unit taking into account a dynamic driving condition of the motor vehicle for limiting adjustments of the transmission ratio, and an active adjusting signal for actively determining adjustments of the transmission ratio;
   the fuzzy logic unit also taking into account increased vehicle loading when setting the transmission ratio.

2. The controller according to claim 1, including a signal conditioning circuit connected to the fuzzy logic unit for averaging a signal reproducing the gas pedal position and a throttle valve position over a prescribed period.

3. The controller according to claim 2, wherein said signal conditioning circuit forms a difference of each two signals reproducing a transverse acceleration of the motor vehicle in successive time intervals and uses the difference to detect a start of cornering.

4. The controller according to claim 2, wherein said signal conditioning circuit determines a frequency of adjustment of a gas pedal during a prescribed time interval and uses the frequency of adjustment to evaluate the driving style of the driver.

5. The controller according to claim 2, wherein said signal conditioning circuit forms and averages an absolute value of a difference between driving and braking forces and tractive resistances of the motor vehicle in a plane over a prescribed period to obtain a mean value, and determines a type of roadway and a loading of the motor vehicle from the mean value.

6. The controller according to claim 2, wherein the data used to control the transmission ratio are stored in characteristic maps connected to said signal conditioning circuit.

7. The controller according to claim 1, wherein the data used to control the transmission ratio are generated by another fuzzy logic unit.

8. The controller according to claim 1, wherein the fuzzy rule base fixes or varies a characteristic map as a function of a respectively preceding characteristic map, with a first selection signal characterizing the driving style of the driver, and a second selection signal characterizing the load condition of the motor vehicle.

9. The controller according to claim 8, wherein the fuzzy rule base fixes and varies the characteristic map as a function of a third selection signal characterizing a type of roadway being driven upon.

10. The controller according to claim 1, wherein a characteristic map is varied by pointwise displacement of transmission ratio value assignments.

* * * * *